United States Patent
Shiohara

(10) Patent No.: US 8,159,502 B2
(45) Date of Patent: Apr. 17, 2012

(54) IMAGE INPUT UNIT AND IMAGE INPUT METHOD

(75) Inventor: Ryuichi Shiohara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 927 days.

(21) Appl. No.: 12/104,640

(22) Filed: Apr. 17, 2008

(65) Prior Publication Data

US 2008/0198174 A1 Aug. 21, 2008

Related U.S. Application Data

(63) Continuation of application No. 11/797,570, filed on May 4, 2007, now Pat. No. 7,830,398, which is a continuation of application No. 11/396,578, filed on Apr. 4, 2006, now Pat. No. 7,230,631, which is a continuation of application No. 10/618,690, filed on Jul. 15, 2003, now Pat. No. 7,042,465, which is a continuation-in-part of application No. PCT/JP02/00478, filed on Jan. 23, 2002.

(30) Foreign Application Priority Data

Jan. 23, 2001 (JP) ................................ 2001-014822

(51) Int. Cl.
G09G 5/02 (2006.01)

(52) U.S. Cl. ....................................... 345/604; 345/600

(58) Field of Classification Search .................. 345/604, 345/600
See application file for complete search history.

(56) References Cited

U.S. PATENT DOCUMENTS

| | | | |
|---|---|---|---|
| 5,726,682 A | 3/1998 | Lurn et al. | |
| 5,737,032 A * | 4/1998 | Stenzel et al. | 348/649 |
| 5,798,767 A | 8/1998 | Poole et al. | |
| 6,219,457 B1 * | 4/2001 | Potu | 382/246 |
| 6,268,847 B1 | 7/2001 | Glen | |
| 6,486,889 B1 | 11/2002 | Meyers et al. | |
| 6,510,242 B1 * | 1/2003 | Westerman | 382/162 |
| 6,518,970 B1 | 2/2003 | Glen | |
| 6,694,379 B1 | 2/2004 | Hanko et al. | |
| 6,903,753 B1 | 6/2005 | Gray, III et al. | |
| 6,958,772 B1 | 10/2005 | Sugimori | |
| 7,034,828 B1 | 4/2006 | Drebin et al. | |

FOREIGN PATENT DOCUMENTS

| | | |
|---|---|---|
| JP | 61-257071 A | 11/1986 |
| JP | 62-219082 A | 9/1987 |
| JP | 63-146573 A | 6/1988 |
| JP | 2-142292 A | 5/1990 |
| JP | 05-011641 U | 2/1993 |

(Continued)

*Primary Examiner* — Xiao M. Wu
*Assistant Examiner* — Maurice L McDowell, Jr.
(74) *Attorney, Agent, or Firm* — Sughrue Mion, PLLC

(57) ABSTRACT

The invention is characterized by the fact that an area sensor for outputting an analog signal responsive to the light reception amount of light of CMYG is used and when CMYG image data is converted into RGB image data, RGB image data having a domain also in negative values is generated without performing processing of putting the RGB image data into values of 0 or more, without decreasing the information amount of the CMYG image data. Further, the invention is characterized by the fact that when the image data is recorded in a file section 16 finally as a JPEG file, the pixel data of each color of YCbCr is represented as data type of eight bits and the information amount per pixel is 24 bits for recording more color information without increasing the memory capacity.

20 Claims, 3 Drawing Sheets

FOREIGN PATENT DOCUMENTS

| | | |
|---|---|---|
| JP | 5-30344 A | 2/1993 |
| JP | 5-183743 A | 7/1993 |
| JP | 2001-008026 | 1/2001 |
| WO | WO 99/25123 A | 5/1999 |

* cited by examiner

| Ye | Cy | Ye | Cy |
|----|----|----|----|
| G  | Mg | G  | Mg |
| Ye | Cy | Ye | Cy |
| G  | Mg | G  | Mg |

11

COLOR SPACE THAT CAN BE RECOGNIZED BY HUMAN BEING

RGB COLOR SPACE (R, G, B > 0)

RGB COLOR SPACE EXPANDED AS R IS EXPANDED TO NEGATIVE AREA

IMAGE INPUT UNIT AND IMAGE INPUT METHOD

This is a Continuation of application Ser. No. 11/797,570 filed May 4, 2007, which is a Continuation Application of Ser. No. 11/396,578 filed Apr. 4, 2006, which is a Continuation of application Ser. No. 10/618,690 filed Jul. 15, 2003, which is a Continuation-in-Part of PCT Application No. PCT/JP02/00478 filed Jan. 23, 2002. The entire disclosures of the prior applications, application Ser. Nos. 11/797,570, 11/396,578, 10/618,690 and PCT/JP02/0078 are considered part of the disclosure of the accompanying continuation application and are hereby incorporated by reference.

BACKGROUND OF THE INVENTION

The present invention relates to an image input unit and an image input method for inputting a color image to be printed out.

Hitherto, in a printer, complementary color ink has been used to finally output image data representing the values of CMY (Cyan, Magenta, Yellow) or CMYK (Cyan, Magenta, Yellow, black) and in a monitor, image data representing the value of RGB (Red, Green Blue) is finally output. Generally, in image processing using a computer, color matching is performed with the display colors of a monitor as the reference and therefore in an image input unit such as a digital still camera, image data is represented in the area of RGB color space with the RGB values taking 0 or more. For example, in not only a digital still camera using primary color CCD, but also a digital still camera using complementary color CCD, when CMYG (Cyan, Magenta, Yellow, Green) image data provided from an input image is converted into RGB image data, processing of adjusting the components of a conversion matrix or replacing negative values with 0 is performed and only RGB values of 0 or more are output.

For example, in sRGB standard, color coordinates of RGB are determined and RGB color space wherein the RGB values are 0 or more is defined. However, the sRGB color space is narrower than the color space that can be recognized by the visual sense of a human being and thus only a color space in a narrower range than the visual sense of a human being can be represented in an image input unit for outputting an image represented in the sRGB color space.

On the other hand, in a printer, a color space wherein the CMY or CMYK values are 0 or more can be represented by printing. A printer for outputting an image represented in the color space wherein the CMY or CMYK values are 0 or more can use pigments for color development on the outside of the sRGB color space as CMY ink, thereby representing a wider color space than the sRGB-defined color space by printing. Likewise, the printer can represent a wider color space by printing than a color monitor manufactured with sRGB display as the reference.

For such a printer to print image data recorded in an image input unit such as a digital still camera for recording an image represented in a color space wherein RGB colors represented in sRGB are 0 or more, the image is represented only in a narrower range than the color representation area of the printer, and the characteristics of the printer are not used effectively; this is a problem.

In recent years, image data format standards allowing negative values in the colors of sRGB64, RIMM-RGB, etc., have been developed. However, if an attempt is made to allow negative values and improve the image quality, the information amount per pixel is increased three bits and thus the image data formats result in an increase in the data capacity.

SUMMARY OF THE INVENTION

The invention is embodied considering such problems and it is an object of the invention to provide an image input unit and an image input method for expanding color space of a print image without increasing the data capacity.

It is another object of the invention to provide an image input unit and an image input method for expanding color space of a print image without impairing the compatibility with an image file format in a digital camera in a related art.

In order to solve the aforesaid object, the invention is characterized by having the following arrangement.

(1) An image, input unit comprising:
a data generator which generates RGB image data representing each value of RGB for each pixel as signed data type from an input image; and
a data converter which converts the RGB image data into YCbCr image data representing each value of YCbCr for each pixel.

(2) The image input unit according to (1), wherein the data generator generates CMY or CMYG image data representing each value of CMY or CMYG for each pixel as unsigned data type from the input image, and converts the CMY or CMYG image data into the RGB image data.

(3) The image input unit according to (2), wherein the data generator includes a signed arithmetic circuit for converting the CMY or CMYG image data into the RGB image data.

(4) The image input unit according to (2), wherein the data generator generates CMY or CMYG image data representing each value of CMY or CMYG for each pixel as unsigned data type of 10 bits or more from the input image.

(5) The image input unit according to (1), wherein
the RGB image data representing each value of RGB for each pixel generated by the data generator is signed data type of nine bits or more, and
the RGB image data into YCbCr image data representing each value of YCbCr for each pixel converted by the data converter is unsigned data type of eight bits.

(6) The image input unit according to (1), wherein the data converter enlarges color saturation represented by CbCr.

(7) An image input method comprising:
a data generation step of generating RGB image data representing each value of RGB for each pixel as signed data type from an input image; and
a data conversion step of converting the RGB image data into YCbCr image data representing each value of YCbCr for each pixel.

(8) The image input method according to (7), wherein at the data generation step, CMY or CMYG image data representing each value of CMY or CMYG for each pixel as unsigned data type is generated from the input image, and the CMY or CMYG image data is converted into the RGB image data.

(9) The image input method according to (8), wherein at the data generation step, CMY or CMYG image data representing each value of CMY or CMYG for each pixel as unsigned data type of 10 bits or more is generated from the input image.

(10) The image input method according to (7), wherein
RGB image data representing each value of RGB for each pixel generated at the data generation step is signed data type of nine bits or more is generated, and
YCbCr image data representing each value of YCbCr for each pixel converted from the RGB image data at the data conversion step is unsigned data type of eight bits.

(11) The image input method according to (7), wherein at the data conversion step, color saturation represented by CbCr is enlarged.

DETAILED DESCRIPTION OF PREFERRED EMBODIMENTS

One embodiment of the invention will be discussed with reference with the accompanying drawings.

Figure 1:
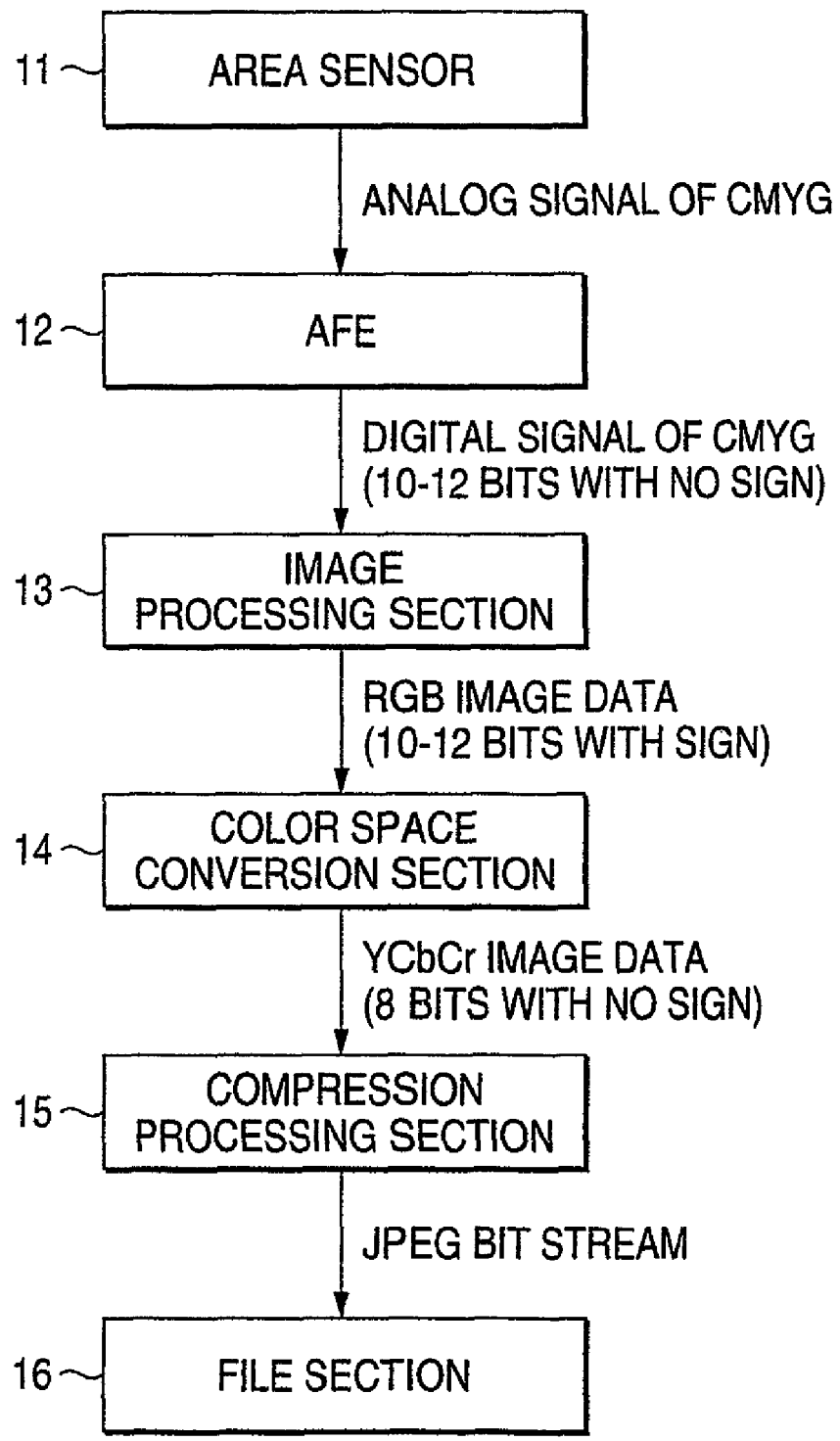
FIG. 1 is a data flowchart to show the contents of data transferred between blocks shown in FIG. 2.
Figure 2:
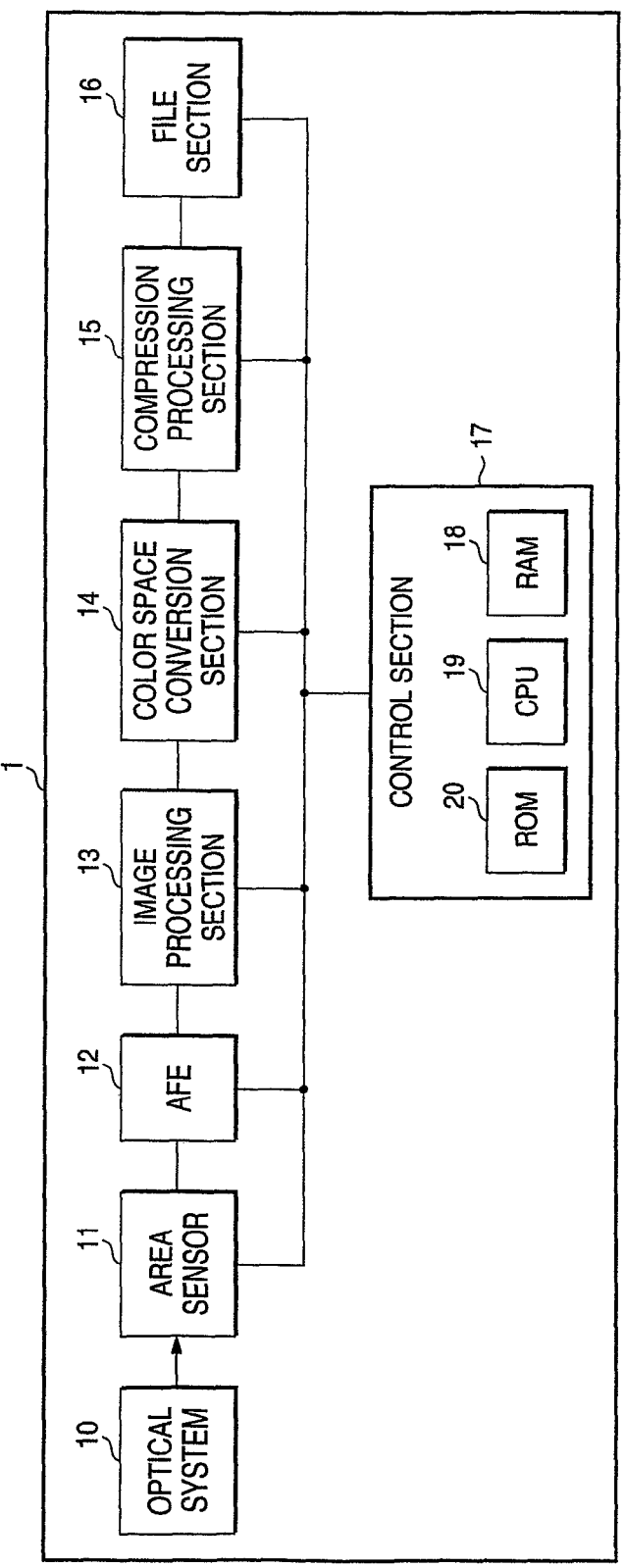
FIG. 2 is a block diagram to show a digital still camera 1 as one embodiment of an image input unit according to the invention.

FIG. 2 is a block diagram to show a digital still camera 1 as one embodiment of an image input unit according to the invention. FIG. 1 is a data flowchart to show the contents of data transferred between the blocks shown in FIG. 2. An optical system 10, an area sensor 11, an AFE (Analog Front End) 12, and an image processing section 13 corresponds to a data generator in Claims, and a color space conversion section 14 corresponds to a data converter in Claims.

The optical system 10 is constituted by an optical lens, an infrared cut filter, an optical low-pass filter, etc., for forming a subject image as an input image on the area sensor 11.

Figures 3, 4:
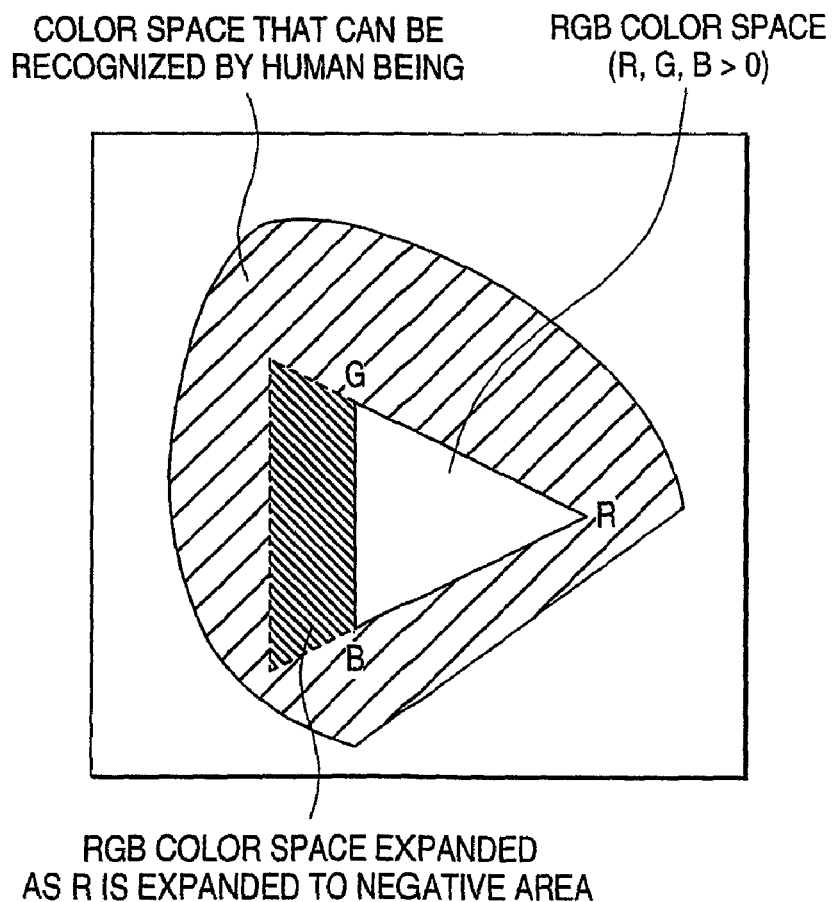
FIG. 3 is a schematic drawing to show an area sensor of the digital still camera according to the embodiment of the invention.
FIG. 4 is a schematic drawing to make a comparison between the area of RGB color space and that of color space that can be recognized by a human being.

The area sensor 11 is an optical sensor of CCD, a CMOS sensor, etc., comprising photoelectric conversion elements for converting light into an electric signal, and each photoelectric conversion element is provided with a complementary color filter for allowing light of wavelength of any of C (Cyan), M (Magenta), Y (Yellow), or G (Green) to pass through. The photoelectric conversion elements are placed like a matrix as shown in FIG. 3. The description to follow assumes that the area sensor comprising the photoelectric conversion elements each provided with a complementary color filter of any of C, M, Y, or G is used, but complementary color filters of three colors of CMY may be used as the filters of the photoelectric conversion elements. The purpose of acquiring color information of G in addition to color information of CMY is to directly acquire color information of G recognized sensitively by the visual sense, thereby improving the image quality. The area sensor 11 outputs an analog signal responsive to the light reception amount of light of wavelength of any of CMYG in each photoelectric conversion element to the AFE 12.

The AFE 12 is constituted by a program gain amplifier, a CDS circuit, an A/D converter, etc., for sampling the analog signal output from each photoelectric conversion element and generating a digital signal representing the value of any of CMYG in each photoelectric conversion element as 10 to 12-bit data type. The analog signal is quantized to a digital signal of data type having a length of 10 bits or more, whereby high-quality YCbCr image data can be generated in the color space conversion section 14. The digital signal of CMYG is input to the image processing section 13 directly or after it is stored in buffer memory.

The image processing section 13 is implemented as an ASIC or DSP (Digital Signal Processor) engine implementing a predetermined algorithm as a logical circuit. If the image processing section 13 is implemented as an ASIC, processing can be speeded up as compared with the case where processing is performed by execution of a program in a DSP engine. The image processing section 13 performs AE (Auto Exposure), AWB (Auto White Balance), image generation processing, conversion processing from CMYG color space to RGB color space, γ correction processing, etc. The image generation processing mentioned here is mainly processing of generating CMYG image data having four values of CMYG for each pixel by performing interpolation processing, etc., using a digital signal representing the value of any of CMYG in each photoelectric conversion element. The conversion processing from CMYG color space to RGB color space is performed by a 4×3 matrix arithmetic processing circuit of ASIC or a multiplication circuit and an addition-subtraction circuit of DSP, CPU 19, etc. To allow negative values as the values of RGB output as a result of the conversion processing, the matrix arithmetic processing circuit, the multiplication circuit, the addition-subtraction circuit, and the like used for the conversion processing are formed as signed arithmetic circuits. The RGB image data representing each value of RGB is represented as data type having a larger number of bits than the number of bits of CMYG image data by one bit corresponding to a sign bit. For example, if CMYG image data is data type of a length of 12 bits having a domain of each color ranging from 0 to $2^{12}-1$, RGB image data becomes signed data type of a length of 13 bits having a domain of each color ranging from $-2^{12}-1$ to $+2^{12}-1$. It is desirable that data type of a length of each color nine bits or more should be assigned to RGB image data for representing the data at least in the range of −64 to 255. Further, if the domain is expanded to the range of −160 to 255, an image particularly good in color reproducibility can be provided. Taking the domain of R large in both positive and negative ranges leads particularly to improvement of the image quality.

The color space conversion section 14 is constituted by a 3×3 matrix arithmetic processing circuit or a multiplication circuit and an addition-subtraction circuit of DSP, CPU 19, etc. The color space conversion section 14 performs linear conversion using a 3×3 matrix, thereby generating YCbCr image data representing the values of YCbCr from RGB image data. The matrix arithmetic processing circuit, the multiplication circuit, the addition-subtraction circuit, and the like used for the conversion processing are formed as signed arithmetic circuits. To compress and record image data in removable memory in a JPEG file format, the color space conversion section 14 needs to output YCbCr image data rounded to eight bits. For the color space conversion, using the following expressions conforming to ITU-R BT.601

$Y=0.299R+0.587G+0.114B$ $Cb=(-0.299R-0.587G+0.886B)\times0.564+\text{offset}$ $Cr=(0.701R-0.587G-0.114B)\times0.713+\text{offset}$ for example, the conversion expressions $Y=0.2990R+0.5870G+0.1140B$ $Cb=-0.1687R-0.3313G+0.5000B+128$ $Cr=0.5000R-0.4187G-0.0813B+128$ can be used.

In the conversion processing using the expressions, arithmetic processing is performed internally with precision of nine bits or more with a sign and at the final output time, YCbCr is rounded to precision of eight bits and each value of YCbCr is output as unsigned data type of the length of eight bits having a domain ranging from 0 to 255. The purpose of rounding YCbCr to precision of eight bits at the final output time is to make the image data compatible with JPEG compression processing. In the process of the conversion processing, the values of CbCr may be increased in an equal ratio for enlarging the sizes of vectors represented by the values of CbCr, thereby increasing the brightness of an image. When color saturation is enlarged, the color saturation is made large in response to the color saturation before enlargement so as to enlarge the distribution area of the color saturation of each pixel. For example, the color saturation before enlargement is multiplied by a constant, thereby making the color saturation large. Such processing results in diametrically enlarging a Munsell color solid that can be represented by the values of YCbCr. Such processing is fitted particularly for simulatedly compensating for brightness information lost in the process of performing arithmetic processing of the values of RGB.

A compression processing section 15 may be implemented as an ASIC dedicated to compression processing or may be implemented as a DSP, CPU 19, etc. The compression processing section 15 performs compression processing conforming to the JPEG standard using DCT (Discrete Cosine Transform) and Huffman coding, and outputs a JPEG bit stream to a file section 16.

The file section 16 records image data compressed in the JPEG file format in removable memory such as flash memory. The image file format need not be JPEG and if the image file format is an image file format consisting of information of YCbCr, the invention can be applied; for example, the image data may be recorded in the image file format of TIFF-YCbCr.

A control section 17 includes: ROM 20 recording a control program, etc.; a CPU 19 for executing the control program, thereby controlling the optical system 10, the area sensor 11, the AFE 12, and ASIC or DSP implementing the image processing section 13, the color space conversion section 14, and the compression processing section 15; and RAM 18 for storing various pieces of data as the control program is executed. The ROM 20, the CPU 19, and the RAM 18 are connected each other by a bus.

The embodiment is characterized by the fact that the area sensor 11 for outputting an analog signal responsive to the light reception amount of light of wavelength of any of CMYG for each photoelectric conversion element is used to generate CMYG image data and when the CMYG image data is converted into RGB image data, RGB image data having a domain also in negative values is generated without performing processing of putting the RGB image data into values of 0 or more, namely, without decreasing the information amount of the CMYG image data. FIG. 4 schematically shows the color space of RGB taking values of 0 or more and the color space that can be recognized by a human being. As shown in FIG. 4, the color space that can be recognized by a human being is wider than the color space of RGB taking values of 0 or more. Thus, if conversion is executed from the color space of CMY taking values of 0 or more to the color space of RGB taking values of 0 or more as in the related art, loss of color information that can be recognized by a human being occurs, resulting in color distortion before and after the conversion. In the above-described embodiment, negative values are allowed as input of the color space conversion section 14, so that the color space that can be represented by an image consisting of color information of RGB is expanded and, for example, when an image is printed out using complementary color ink, it is made possible to exhaustively represent the color information provided at the input time.

Further, the embodiment is characterized by the fact that to record the image data in the file section 16 finally as a JPEG file, the YCbCr image data is represented as unsigned data type of eight bits and the information amount per pixel just before compression processing is performed is 24 bits for recording more color information without increasing the memory capacity. This uses the nature such that even if the RGB image data contains a negative value, if the RGB image data is converted into YCbCr image data according to the above-described conversion expressions, the YCbCr image data is put in a value of 0 or more.

That is, according to the embodiment, negative values are allowed for RGB image data and image processing is performed with precision of nine bits or more for each color of RGB until just before conversion to YCbCr color space, and after conversion to YCbCr color space, the data is rounded to the precision of each color eight bits, whereby the image data can be recorded without increasing the data capacity. Therefore, on the output side, the values of RGB are output as data type having a domain to negative values at the inverse conversion time from the color space represented by YCbCr to the RGB color space, and conversion is executed from the RGB color spade to the CMY color space without losing the color information provided at the input time, so that color matching between the input image of the digital still camera 1 and the print image can be improved.

In the description of the embodiment, an input image is provided through the area sensor 11 comprising complementary color filters. However, if the area sensor 11 uses primary color filters of RGB, the image processing section 13 generates RGB image data provided with negative values by performing matrix arithmetic processing from RGB image data having a value of 0 or more in each color, whereby it is also possible to widen the area of the color space provided after γ correction processing, for example.

In the description of the embodiment, the digital still camera is illustrated as the image input unit, but the invention can also be applied to other image input units of a digital video camera, a scanner, a facsimile, etc.

The invention claimed is:

1. An image processing apparatus comprising:
 a data getter which gets YCbCr image data representing each value of Y, Cb and Cr as an unsigned data type, Y being a data type of eight bits; and
 a data converter which converts the YCbCr image data into RGB image data representing each value of R, G and B as a signed data type, the RGB image data including a negative value in at least one of R, G and B,
 wherein a gradation level of the R, G and B of the RGB image data converted from the YCbCr image data is greater than a gradation level of the Y, Cb and Cr of YCbCr image data.

2. The image processing apparatus according to claim 1, wherein the YCbCr image data has color information which corresponds to a negative value of R, G and B.

3. An image processing apparatus comprising:
 a data getter which gets YCbCr image data representing each value of Y, Cb and Cr as an unsigned data type, Y being a data type of eight bits; and
 a data converter which converts the YCbCr image data into RGB image data representing each value of R, G and B as a signed data type, the RGB image data including a negative value in at least one of R, G and B,
 wherein a number of bits which represent the R, G and B of the RGB image data converted from the YCbCr image data is greater than a number of bits which represent the Y, Cb and Cr of YCbCr image data.

4. The image processing apparatus according to claim 3, wherein the YCbCr image data has color information which corresponds to a negative value of R, G and B.

5. An image processing apparatus comprising:
a data getter which gets YCbCr image data representing each value of Y, Cb and Cr as an unsigned data type, Y being a data type of eight bits; and
a data converter which converts the YCbCr image data into RGB image data representing each value of R, G and B as a signed data type, the RGB image data including a negative value in at least one of R, G and B,
wherein the R, G and B of the RGB image data is a data type of nine bits or more.

6. An image processing method comprising:
getting YCbCr image data representing each value of Y, Cb and Cr as a unsigned data type, Y being a data type of eight bits; and
using a processor to convert the YCbCr image data into RGB image data representing each value of R, G and B as a signed data type, the RGB image data including a negative value in at least one of R, G and B,
wherein a gradation level of the R, G and B of the RGB image data converted from the YCbCr image data is greater than a gradation level of the Y, Cb and Cr of YCbCr image data.

7. A non-transitory computer-readable medium storing a computer program to cause a computer to execute the method according to claim 6.

8. An image processing method comprising:
getting YCbCr image data representing each value of Y, Cb and Cr as a unsigned data type, Y being a data type of eight bits; and
using a processor to convert the YCbCr image data into RGB image data representing each value of R, G and B as a signed data type, the RGB image data including a negative value in at least one of R, G and B,
wherein a number of bits which represent the R, G and B of the RGB image data converted from the YCbCr image data is greater than a number of bits which represent the Y, Cb and Cr of YCbCr image data.

9. A non-transitory computer-readable medium storing a computer program to cause a computer to execute the method according to claim 8.

10. An image processing method comprising:
getting YCbCr image data representing each value of Y, Cb and Cr as a unsigned data type, Y being a data type of eight bits; and
using a processor to convert the YCbCr image data into RGB image data representing each value of R, G and B as a signed data type, the RGB image data including a negative value in at least one of R, G and B,
wherein the R, G and B of the RGB image data is a data type of nine bits or more.

11. A non-transitory computer-readable medium storing a computer program to cause a computer to execute the method according to claim 10.

12. An image processing apparatus comprising:
a data getter which gets YCbCr image data that represents each value of Y, Cb and Cr wherein a color in a negative area of RGB color space is allowed in the YCbCr image data; and
a data converter which converts the YCbCr image data into RGB image data representing each value of R, G and B, wherein the value of Y is 8 bits and the RGB image data comprises a pixel which has a color in a negative area of RGB color space, and
wherein a gradation level of the R, G and B of the RGB image data converted from the YCbCr image data is greater than a gradation level of the Y, Cb and Cr of YCbCr image data.

13. An image processing apparatus comprising:
a data getter which gets YCbCr image data that represents each value of Y, Cb and Cr wherein a color in a negative area of RGB color space is allowed in the YCbCr image data; and
a data converter which converts the YCbCr image data into RGB image data representing each value of R, G and B,
wherein the value of Y is 8 bits and the RGB image data comprises a pixel which has a color in a negative area of RGB color space, and
wherein a number of bits which represent the R, G and B of the RGB image data converted from the YCbCr image data is greater than a number of bits which represent the Y, Cb and Cr of YCbCr image data.

14. An image processing apparatus comprising:
a data getter which gets YCbCr image data that represents each value of Y, Cb and Cr wherein a color in a negative area of RGB color space is allowed in the YCbCr image data; and
a data converter which converts the YCbCr image data into RGB image data representing each value of R, G and B,
wherein the value of Y is 8 bits and the RGB image data comprises a pixel which has a color in a negative area of RGB color space, and
wherein the R, G and B of the RGB image data is a data type of nine bits or more.

15. An image processing method comprising:
getting YCbCr image data that represents each value of Y, Cb and Cr wherein a color in a negative area of RGB color space is allowed in the YCbCr image data; and
using a processor to convert the YCbCr image data into RGB image data representing each value of R, G and B,
wherein the value of Y is 8 bits and the RGB image data comprises a pixel which has a color in a negative area of RGB color space, and
wherein a gradation level of the R, G and B of the RGB image data converted from the YCbCr image data is greater than a gradation level of the Y, Cb and Cr of YCbCr image data.

16. A non-transitory computer-readable medium storing a computer program to cause a computer to execute the method according to claim 14.

17. An image processing method comprising:
getting YCbCr image data that represents each value of Y, Cb and Cr wherein a color in a negative area of RGB color space is allowed in the YCbCr image data; and
using a processor to convert the YCbCr image data into RGB image data representing each value of R, G and B,
wherein the value of Y is 8 bits and the RGB image data comprises a pixel which has a color in a negative area of RGB color space, and
wherein a number of bits which represent the R, G and B of the RGB image data converted from the YCbCr image data is greater than a number of bits which represent the Y, Cb and Cr of YCbCr image data.

18. A non-transitory computer-readable medium storing a computer program to cause a computer to execute the method according to claim 17.

19. An image processing method comprising:
getting YCbCr image data that represents each value of Y, Cb and Cr wherein a color in a negative area of RGB color space is allowed in the YCbCr image data; and
using a processor to convert the YCbCr image data into RGB image data representing each value of R, G and B,
wherein the value of Y is 8 bits and the RGB image data comprises a pixel which has a color in a negative area of RGB color space, and
wherein the R, G and B of the RGB image data is a data type of nine bits or more.

20. A non-transitory computer-readable medium storing a computer program to cause a computer to execute the method according to claim 19.

* * * * *